US009033265B2

(12) United States Patent
Truan et al.

(10) Patent No.: US 9,033,265 B2
(45) Date of Patent: May 19, 2015

(54) MATERIAL SPREADER UTILIZING VEHICLE POWER AND HAVING OPERATIONAL WIRELESS CONTROL

(76) Inventors: Charles Truan, Bloomfield Hills, MI (US); James Truan, Bloomfield Hills, MI (US); Joshua Scott, Troy, MI (US); Greg B. Neilson, Royal Oak, MI (US); Erwin B. Neilson, Royal Oak, MI (US); Paul Mandrik, Clinton Township, MI (US)

(*) Notice: Subject to any disclaimer, the term of this patent is extended or adjusted under 35 U.S.C. 154(b) by 663 days.

(21) Appl. No.: 12/841,721

(22) Filed: Jul. 22, 2010

(65) Prior Publication Data
US 2011/0017847 A1   Jan. 27, 2011

Related U.S. Application Data

(60) Provisional application No. 61/227,567, filed on Jul. 22, 2009.

(51) Int. Cl.
A01C 3/06 (2006.01)
A01C 17/00 (2006.01)
E01C 19/20 (2006.01)

(52) U.S. Cl.
CPC ............ *A01C 17/001* (2013.01); *A01C 17/005* (2013.01); *E01C 19/20* (2013.01); *E01C 19/203* (2013.01)

(58) Field of Classification Search
CPC .... A01C 17/001; A01C 17/005; E01C 19/20; E01C 19/203
USPC ........... 239/67, 661, 663, 668, 677, 679, 681, 239/684, 687, 688
See application file for complete search history.

(56) References Cited

U.S. PATENT DOCUMENTS

| | | | |
|---|---|---|---|
| 2,561,002 A * | 7/1951 | Weeks | 239/661 |
| 4,058,180 A | 11/1977 | Dreyer | |
| 5,145,116 A | 9/1992 | Shaver | |
| 5,361,201 A | 11/1994 | Jost et al. | |
| 5,857,174 A | 1/1999 | Dugan | |
| 5,988,534 A | 11/1999 | Kost et al. | |
| 6,089,478 A | 7/2000 | Truan et al. | |
| 6,502,771 B1 | 1/2003 | Wyne | |
| 6,609,118 B1 | 8/2003 | Khedkar et al. | |
| 6,633,875 B2 | 10/2003 | Brady | |
| 6,715,703 B2 * | 4/2004 | Kost et al. | 239/687 |
| 6,722,590 B2 | 4/2004 | Kost et al. | |
| 6,751,596 B1 | 6/2004 | Hastings | |
| 6,932,287 B2 | 8/2005 | Kost et al. | |
| 6,978,952 B2 | 12/2005 | Kost et al. | |

(Continued)

*Primary Examiner* — Christopher Kim
(74) *Attorney, Agent, or Firm* — Dickinson Wright PLLC

(57) ABSTRACT

A material spreader assembly for the broadcast spreading of particulate material from the trailer hitch of a vehicle. A hopper for storing the particulate material is supported by a frame having a trailer hitch coupler for connection to the vehicle. A spreader including a spinner driven by an electric motor receives and disperses the particulate material. A control circuit receives electric current from the vehicle via a plug interface and a wiring harness and controls the operation of the spreader. A remote communicates user commands to the control circuit. The control circuit includes a motor control processor that controls a motor power relay and a motor driver to gradually ramp up the current supplied to the spreader for start up the spreader while preventing a high transient current draw spike. Component feedback sensors enable the motor control processor to provide an emergency shut off feature and warning signals.

22 Claims, 5 Drawing Sheets

(56) References Cited

U.S. PATENT DOCUMENTS

| | | |
|---|---|---|
| 7,118,053 B2 | 10/2006 | Truan et al. |
| 7,347,390 B2 | 3/2008 | Truan et al. |
| 7,431,227 B2 | 10/2008 | Gamble, II et al. |
| 2003/0041063 A1 | 2/2003 | Brady |
| 2003/0168522 A1 | 9/2003 | Kost et al. |
| 2003/0168536 A1 | 9/2003 | Kost et al. |
| 2003/0218083 A1 | 11/2003 | Truan et al. |
| 2004/0140377 A1 | 7/2004 | Kost et al. |
| 2004/0144857 A1 | 7/2004 | Kost et al. |
| 2005/0017101 A1 | 1/2005 | Truan et al. |
| 2005/0167533 A1 | 8/2005 | Christy et al. |
| 2005/0189444 A1 | 9/2005 | Kost |
| 2006/0180680 A1 | 8/2006 | Gamble, II et al. |
| 2006/0266853 A1 | 11/2006 | Gamble, II et al. |
| 2006/0273105 A1 | 12/2006 | Gamble, II et al. |
| 2008/0179432 A1 | 7/2008 | Hodge |
| 2010/0044473 A1 | 2/2010 | Truan et al. |

\* cited by examiner

MATERIAL SPREADER UTILIZING VEHICLE POWER AND HAVING OPERATIONAL WIRELESS CONTROL

CROSS REFERENCE TO RELATED APPLICATION

This application claims the benefit of provisional application serial number U.S. 61/227,567 filed Jul. 22, 2009.

BACKGROUND OF THE INVENTION

1. Field of the Invention

A material spreader assembly for broadcast spreading of particulate material from a vehicle having a trailer wiring connector for supplying electrical current.

2. Description of the Prior Art

Various trailer hitch mounted material spreaders for the broadcast spreading of a free flowing material such as salt, sand, seed, fertilizers, and de-icers are well known in the art. An example of such a material spreader is disclosed in U.S. patent application Ser. No. 11/444,176 to Gamble II et al.

Gamble II et al. disclose a material spreader assembly for broadcast spreading of particulate material from a vehicle. The material spreader assembly disclosed by Gamble II et al. includes a frame connected to a coupler such that the material spreader assembly may be supported by the vehicle. The frame supports a hopper for storing particulate material and a spreader that receives and disperses the particulate material from the hopper. Gamble II et al. further disclose powering the spreader by electrical current.

It is also well known that electrical current can be provided to power the electrical components of a trailer through use of a wiring harness. These wiring harnesses feature a plug interface that connects to the trailer wiring connector equipped on many vehicles. It is further known that the trailer wiring connector is only capable of supplying electrical current below a predetermined level. When the trailer wiring connector is subject to a transient electrical current draw spike exceeding the predetermined level an associated voltage drop is produced. It is known that such a transient current draw spike is created by the typical start-up of the spreader and that the corresponding voltage drop will decrease the voltage supplied to the spreader to a level below that which is required for spreader start-up. Accordingly, the material spreader assemblies known in the art cannot be powered by electrical current supplied from a vehicle's trailer wiring connector because the trailer wiring connector cannot support the transient current draw needs of the typical material spreader assembly.

SUMMARY OF THE INVENTION

The material spreader assembly of the subject invention includes a control circuit connected to a wiring harness for delivering electrical current to the spreader. The wiring harness includes a plug interface for connection to the trailer wiring connector of the vehicle. To accomplish the start-up of the spreader, the control circuit delivers to the spreader an initial electrical current level limited to the predetermined level. The control circuit then gradually increases with time the electrical current supplied to the spreader. Accordingly, the control circuit delivers to the spreader a final electrical current level above the predetermined level. In doing so, the control circuit enables start-up of the spreader using the electric current provided by the vehicle and avoids the transient electrical current draw spike that would typically be created. The material spreader assembly of the present invention also includes a coupler providing the ability to quickly mount the material spreader assembly on the vehicle. The material spreader assembly of the present invention further can be controlled by a remote.

ADVANTAGES OF THE INVENTION

Accordingly, the subject invention allows for the powering of a material spreader for the broadcast spreading of free flowing material by electrical current supplied by the trailer wiring connector of a vehicle without creating the transient current draw spike associated with typical spreader start-up. The remote greatly reduces the typical time required to install the material spreader assembly on the vehicle. A typical material spreader installation requires a controller to be hardwired between the material spreader and the vehicle. This is a labor intensive time consuming process when compared to the use of a remote. The quick mounting capability of the coupler, the plug in simplicity of the plug interface, and the remote provide for a material spreader assembly that can be taken out of a box when purchased and quickly installed and used. The material spreader assembly can just as easily be removed for storage or for mounting on a different vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
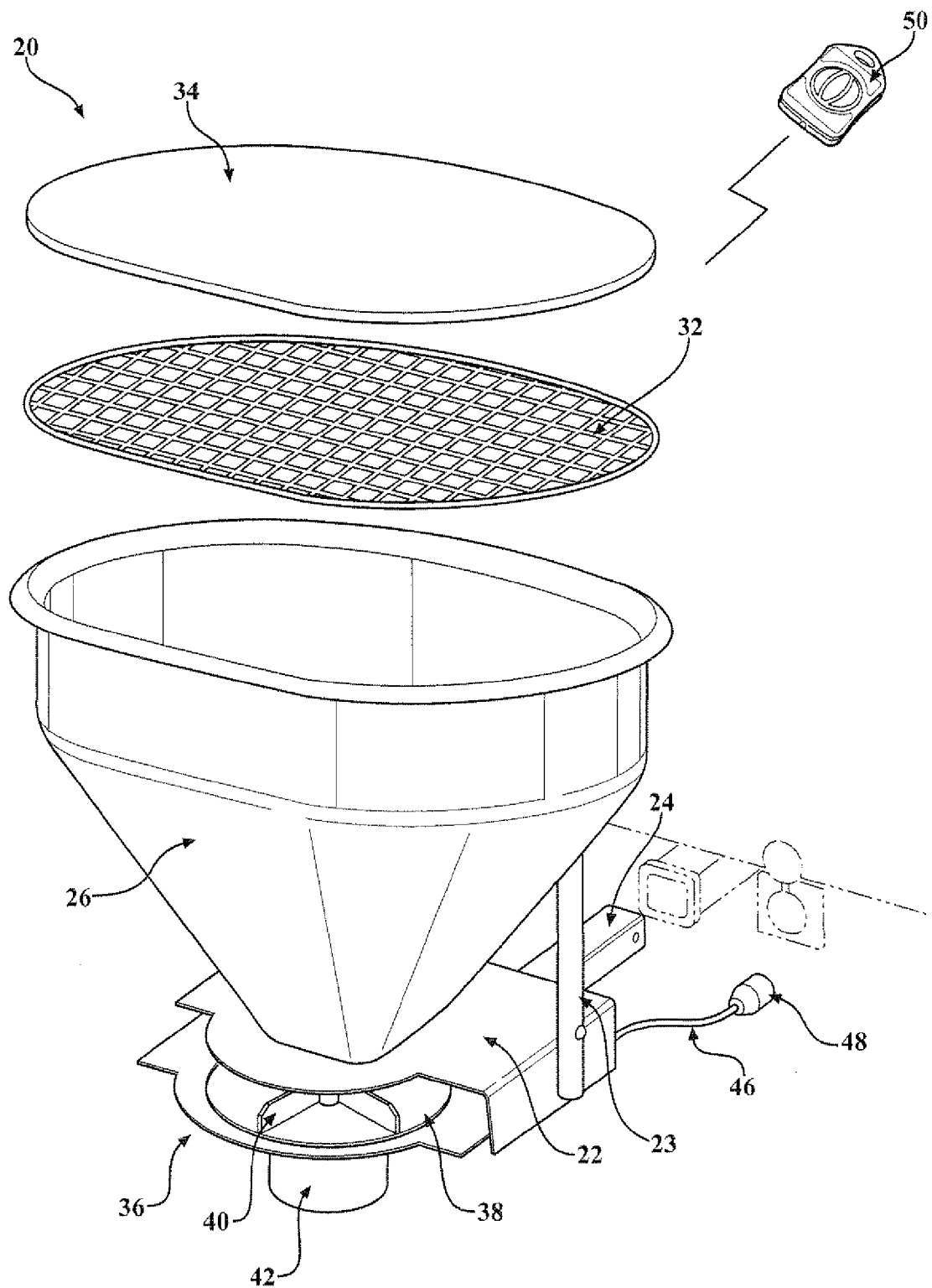
FIG. 1 is a perspective view of an enabling embodiment of a material spreader assembly.

Referring to the Figures, wherein like numerals indicate corresponding parts throughout the several views, a material spreader assembly 20 for broadcast spreading of particulate material from the trailer hitch of a vehicle is shown in FIG. 1.

The material spreader assembly 20 illustrated in FIG. 1 includes a lower frame 22 and an upper frame 23 connected to and supported by the lower frame 22. A coupler 24 is attached to the lower frame 22 so that the material spreader assembly 20 may be connected to and supported by the vehicle. The coupler 24 connects to the trailer hitch receiver of the vehicle. Most commonly vehicles are equipped with 2 inch trailer hitch receivers; however, use with other receiver types including but not limited to a 1¼ inch receiver is contemplated. An advantage of using this configuration is that it allows the material spreader assembly 20 to be quickly removed from a box after purchase and attached to the vehicle. Similarly, the material spreader assembly 20 can be easily removed for storage and be transferred to another vehicle if desired.

The upper frame 23 supports a hopper 26 that stores the particulate material. While the illustrated hopper 26 is funnel shaped, it is understood that a hopper 26 having a different shape may be used. The hopper 26 features a large open top and extends to a narrower bottom that defines an outlet port

28. A gate 30, also supported by the upper frame 23, is positioned adjacent to the bottom of the hopper 26 for movement between opening and closing the outlet port 28 of the hopper 26. Accordingly, the flow of particulate material from the outlet port 28 of the hopper 26 can be restricted or completely blocked by adjustment of the gate 30.

A removable grate 32 is fitted into the open top of the hopper 26 to break apart and disperse clumps of particulate material when the particulate material is being loaded into the hopper 26. Also, a lid 34 for covering the open top of the hopper 26 is provided in the preferred embodiment for containing the particulate material and preventing environmental contaminants and moisture from entering the hopper 26.

A spreader 36 including at least one rotating component 38 disperses the particulate material received from the outlet port 28 of the hopper 26. In the preferred embodiment, a spinner 38 is used as the rotating component. However, it is envisioned that other rotating components 38 such as an auger or a combination of several rotating components 38 could be used. The spinner 38 in the preferred embodiment is positioned below the outlet port 28 of the hopper 26 and features a disc-like shape and a plurality of blades 40 protruding in an upward direction. Accordingly, gravity directs the flow of particulate material from the outlet port 28 of the hopper 26, past the gate 30, and onto the spinner 38 where the blades 40 impact and disperse the particulate such that it is spread over the ground.

The spreader 36 further includes an electric motor 42 connected to and the rotating component 38 or components 38 and rotationally drives the same. In the preferred embodiment, the electric motor 42 is connected to and rotationally drives the spinner 38. A known characteristic of electric motors 42 is that they create a large transient current draw spike whenever electrical current is suddenly supplied during start-up. This transient current draw spike exceeds a predetermined level corresponding with the maximum current draw that the trailer wiring connector installed on the vehicle can support without an associated voltage drop. Accordingly, the standard application of electrical current from the vehicle's trailer wiring connector to the electric motor 42 will not start-up the electric motor 42. To overcome this dilemma, the subject invention includes a control circuit 44 for receiving electrical current from the vehicle, enabling the start-up of the electric motor 42, and controlling the electric motor's 42 operation.

In the preferred embodiment, the control circuit 44 is supported within the lower frame 22 of the material spreader assembly 20. The control circuit 44 receives electrical current from the trailer wiring connector of the vehicle via a wiring harness 46 including a plug interface 48. The plug interface 48 allows for the wiring harness 46 of the material spreader assembly 20 to be quickly connected to or disconnected from the trailer wiring connector of the vehicle. An advantage of this feature includes the ability to quickly install the material spreader assembly 20. Also this feature allows the material spreader assembly 20 to be quickly removed from the vehicle for storage or transfer to another vehicle. In the preferred embodiment, the wiring harness 46 includes a seven-way plug interface 48. Vehicles equipped with trailer hitch receivers are typically equipped with trailer wiring connectors that can accommodate a seven-way plug interface 48 although the present invention contemplates other trailer plug interfaces 48 including but not limited to four-way, five-way, and six-way plugs.

The control circuit 44 receives control commands from the user via a remote 50. In the preferred embodiment, the remote 50 is wireless however use of a hard wired remote 50 is also envisioned. An advantage of wireless remotes is that it provides easy installation and allows for the material spreader assembly 20 to be easily transferred to another vehicle by eliminating the need for the permanent installation of a hard wired remote. In the preferred embodiment, the remote 50 receives electric power from a battery 52 housed within the remote 50. The remote 50 includes a user interface 54 for manual input of an incremental motor speed selection and a motor ON selection and a motor OFF selection for turning the spreader 36 on and off. The incremental motor speed selection allows the user to adjust the operating speed of the spreader 36. While the user interface 54 is located on the remote 50 in the preferred embodiment, it is envisioned that the user interface 54 could be located elsewhere such as on the other components of the material spreader assembly 20. User selection of the motor ON selection generates a corresponding ON signal that is sent to the control circuit 44 and user selection of the motor OFF selection generates a corresponding OFF signal that is sent to the control circuit 44. Similarly, user input of an incremental motor speed generates a corresponding motor speed signal that is sent to the control circuit 44. For example, if a user incrementally selects a 50 percent motor speed setting using the user interface 54 of the remote 50, a motor speed signal corresponding to the 50 percent motor speed setting will be sent to the control circuit 44.

Figure 2:
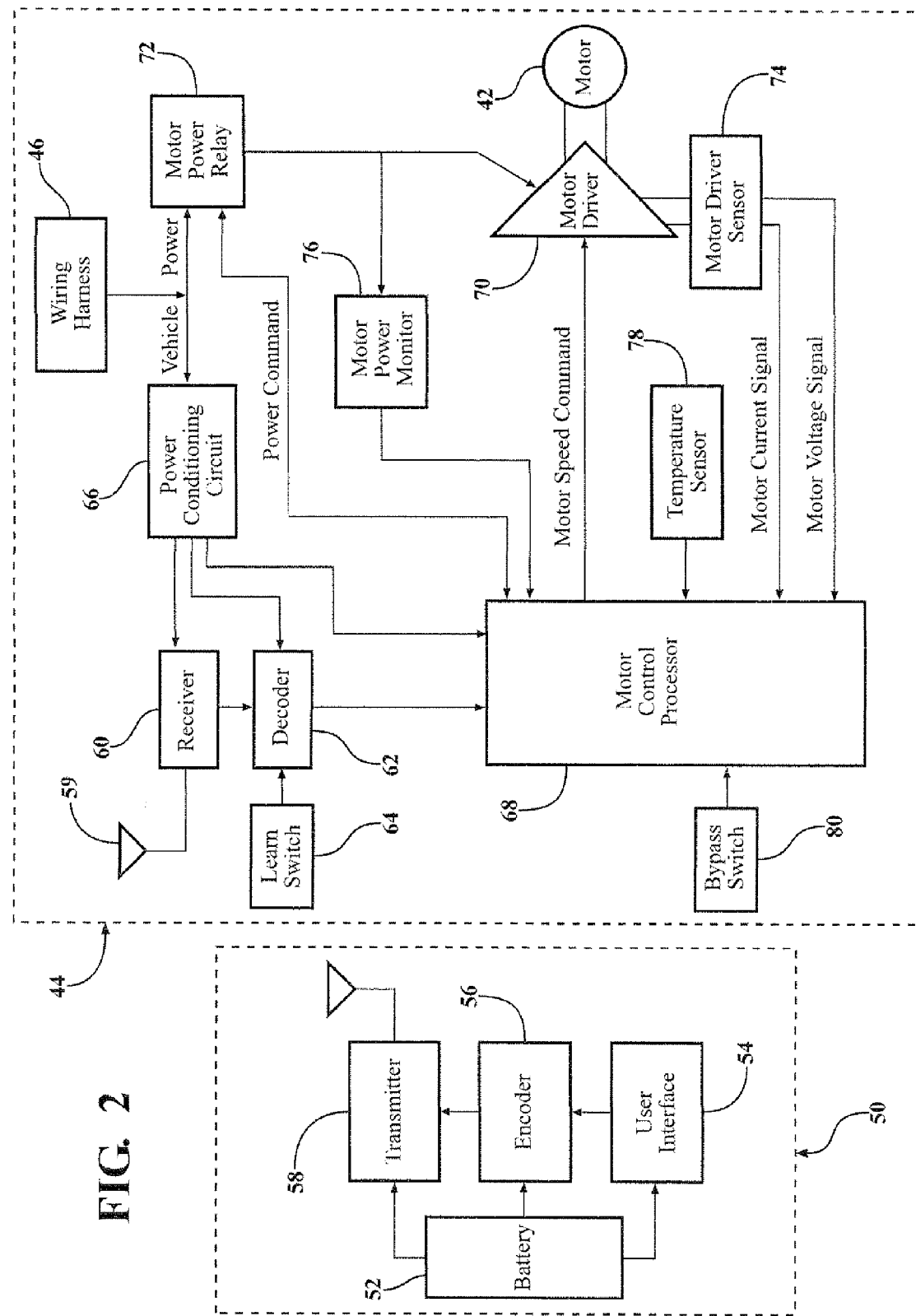
FIG. 2 is a schematic of a first embodiment of a control circuit.

FIG. 2 shows a schematic diagram of the control circuit 44 and the remote 50 configured for one way wireless communication. The remote 50 houses an encoder 56 for adding a unique serial number to the ON signal, the OFF signal, and the motor speed signal to generate a coded ON signal, a coded OFF signal, and a coded motor speed signal. A radio frequency transmitter 58, also housed within the remote 50, receives the coded ON signal, the coded OFF signal, and the coded motor speed signal and transmits the same from the remote 50 to the control circuit 44.

The material spreader assembly 20 includes an antenna 59 mounted to the lower frame 22. The control circuit 44 includes a radio frequency receiver 60 electrically connected to the antenna 59 for receiving the coded ON signal, the coded OFF signal, and the coded motor speed signal transmitted by the radio frequency transmitter 58 of the wireless remote 50. A decoder 62 is electrically connected to the radio frequency receiver 60. The decoder 62 has a memory for storing the unique serial number and a signal processor for receiving the coded ON signal, the coded OFF signal, and the coded motor speed signal from the radio frequency receiver 60 and removing the unique serial number from each to reproduce the ON signal, the OFF signal, and the motor speed signal.

In the preferred embodiment, the control circuit 44 further includes a learn switch 64 electrically connected to the decoder 62 for programming the decoder 62 with the unique serial number stored in the memory of the encoder 56 of the remote 50. The learn switch 64 has an ON position and an OFF position. User selection of the ON position directs the signal processor of the decoder 62 to initiate a learn mode where the unique serial number of the encoder 56 is parsed from any of the coded signals transmitted by the remote 50. The signal processor then stores the unique serial number in the memory of the decoder 62. User selection of the OFF position directs the signal processor to discontinue the learn mode.

The control circuit 44 receives electrical current from the wiring harness 46 and gradually ramps up the electrical current delivered to the spreader 36 at start-up in order to avoid the transient current draw spike normally associated with the start-up. At first, the control circuit 44 supplies the spreader 36 with an initial electrical current level below the predetermined level. The control circuit 44 then gradually increases with time the electrical current supplied to the spreader 36. Thus, a final electrical current level is reached having a magnitude above the predetermined level. This ramping up of the current provided to the spreader 36 by the control circuit 44 enables start-up of the spreader 36 using the electric current provided by the trailer wiring connector of the vehicle.

The control circuit 44 includes a power conditioning circuit 66 electrically connected to the wiring harness 46 for receiving electrical current from the wiring harness 46. It is known that the electrical current supplied by the vehicle's trailer wiring connector has a fluctuating voltage and carries an electronic noise signal. The power conditioning circuit 66 includes an electronic filter for removing the electronic noise signal from the electrical current and a voltage regulator for transforming the fluctuating voltage to a steady state voltage. Accordingly, the power conditioning circuit 66 provides conditioned electrical current that has a steady state voltage and is free of electronic noise to the other components of the control circuit 44.

The control circuit 44 includes a motor control processor 68 electrically connected to and receiving conditioned electrical current from the power conditioning circuit 66. In the preferred embodiment, the motor control processor 68 is electrically connected to the decoder 62 and provides for the start-up of the electric motor 42 in response to receiving an ON signal from the decoder 62. Upon such a receipt, the motor control processor 68 generates a power ON command and an initial motor speed command. The initial motor speed command corresponds to an initial electrical current level below the predetermined level. The motor control processor 68 then generates subsequent motor speed commands that gradually change in magnitude with time to correspond with gradually increasing levels of electrical current. Accordingly, a final motor speed command corresponding to an electrical current level above the predetermined level is generated by the motor control processor 68. The motor control processor 68 provides for the shut-off of the electric motor 42 in response to receiving an OFF signal from the decoder 62. Upon such a receipt, the motor control processor 68 generates a power OFF command.

The motor control processor 68 also provides motor speed control in response to receiving a motor speed signal from the decoder 62. Upon such a receipt, the motor control processor 68 generates a motor speed command corresponding with the incremental motor speed selection made by the user. For example, if the motor control processor 68 receives a motor speed signal corresponding with a user selected 50 percent motor speed setting, the motor control processor 68 will generate a motor speed command specifying a motor speed of 50 percent.

The control circuit 44 includes a motor driver 70 for supplying a specified level of electrical current to the electric motor 42. The motor driver 70 is electrically connected to the electric motor 42 and the motor control processor 68. The motor driver 70 receives motor speed commands and delivers a level of electrical current to the electric motor 42 that corresponds to the motor speed command received. For instance, if the motor driver 70 receives from the motor control processor 68 a motor speed command specifying a motor speed of 50 percent, the motor driver 70 will deliver 50 percent of the available electrical current to the electric motor 42.

The control circuit 44 includes a motor power relay 72 for electrically connecting and disconnecting the electrical current supplied to the electric motor 42 via the motor driver 70. The motor power relay 72 is electrically connected to and receives electrical current of a known polarity from the wiring harness 46. The motor power relay 72 is also electrically connected to the motor control processor 68 and the motor driver 70. The motor power relay 72 delivers electrical current to the motor driver 70 upon receiving a power ON command from the motor control processor 68. The motor power relay 72 disconnects the electrical current supplied to the motor driver 70 upon receiving a power OFF command from the motor control processor 68.

The motor power relay 72 also provides high current reverse polarity protection to the motor driver 70 by disconnecting the electrical current supplied to the motor driver 70 in response to receiving an electrical current having a polarity opposite the known polarity. Additionally, the power conditioning circuit 66 includes at least one blocking diode for providing reverse polarity protection to the control circuit 44. An electrical current having a polarity opposite the known polarity, commonly referred to as a reverse polarity current, could be supplied to the control circuit 44 from the trailer wiring connector if, for instance, the positive battery lead of the vehicle were connected to the negative terminal of the vehicle battery and the negative battery lead of the vehicle were connected to the positive terminal of the vehicle battery. Since such reverse polarity currents can harm the electronic components used in the control circuit 44 and can be particularly damaging to the motor driver 70, the reverse polarity protection provided by the motor power relay 72 and the power conditioning circuit 66 is an additional benefit of the subject invention.

The control circuit 44 also includes at least one component feedback sensor 74, 76, 78 for generating at least one component feedback signal having a predetermined fault limit. In the preferred embodiment, the control circuit 44 has several component feedback sensors 74, 76, 78 including the following three component feedback sensors 74, 76, 78. A motor driver sensor 74 is electrically connected to the motor driver 70 for sending a motor voltage signal and a motor current signal to the motor control processor 68. A motor power monitor 76 is electrically connected to the motor power relay 72 and the motor driver 70 for sending a motor power signal to the motor control processor 68. A temperature sensor 78 for measuring the electric circuitry temperature sends a temperature signal corresponding with the same to the motor control processor 68. Each of these component feedback signals, the motor voltage signal, the motor current signal, the motor power signal, and the temperature signal have a predetermined fault limit. The fault limit of each component feedback signal corresponds to a value indicating that the operating conditions of the material spreader assembly 20 have exceeded normal ranges and that possible damage to the material spreader assembly 20 could ensue.

The motor control processor 68 of the control circuit 44 is responsive to the component feedback signals and provides an emergency shut-off feature in response to receiving at least one component feedback signal. The motor control processor 68 provides for the emergency shut-off of the spreader 36 by sending a power OFF command to the motor power relay 72 in response to detecting the fault limit in any one of the component feedback signals. Accordingly, by turning the spreader 36 off in response to detecting a fault limit in at least one of the component feedback signals, the emergency shut-off feature prevents damage to the material spreader assembly 20.

The motor control processor 68 of the control circuit 44 performs a power-up sequence upon first receipt of electrical current. The control circuit 44 includes a bypass switch 80 electrically connected to the motor control processor 68. The bypass switch 80 has an ON position and an OFF position for manual override of wireless remote 50 commands. User selection of the ON position directs the motor control processor 68 to initiate a bypass mode during the power-up sequence. Accordingly, the motor control processor 68 will only initiate the bypass mode when the bypass switch 80 is in the ON position and the wiring harness 46 is connected to the trailer wiring connector of the vehicle. If the user selects the ON position after the wiring harness 46 has been connected to the trailer wiring connector of the vehicle, the wiring harness 46 must be disconnected and then reconnected before the motor control processor 68 will initiate the bypass mode. The bypass mode directs the motor control processor 68 to disregard any ON signal, OFF signal, or motor speed signal received from the remote 50. The bypass mode further directs the motor control processor 68 to the start-up of the electric motor 42 with the final motor speed command corresponding to a maximum level of electrical current. User selection of the OFF position while in the bypass mode directs the motor control processor 68 to shut-off of the electric motor 42 and to cease sending any motor speed commands or power ON commands until a new power-up sequence is performed. User selection of the OFF position while the wiring harness 46 is disconnected from the trailer wiring connector of the vehicle directs the motor control processor 68 to resume normal operations once the wiring harness 46 is reconnected to the trailer wiring connector of the vehicle. Accordingly, another benefit of the subject invention is that the bypass switch 80 allow for user operation of the material spreader assembly where the remote 50 has been damaged or misplaced.

Figure 3:
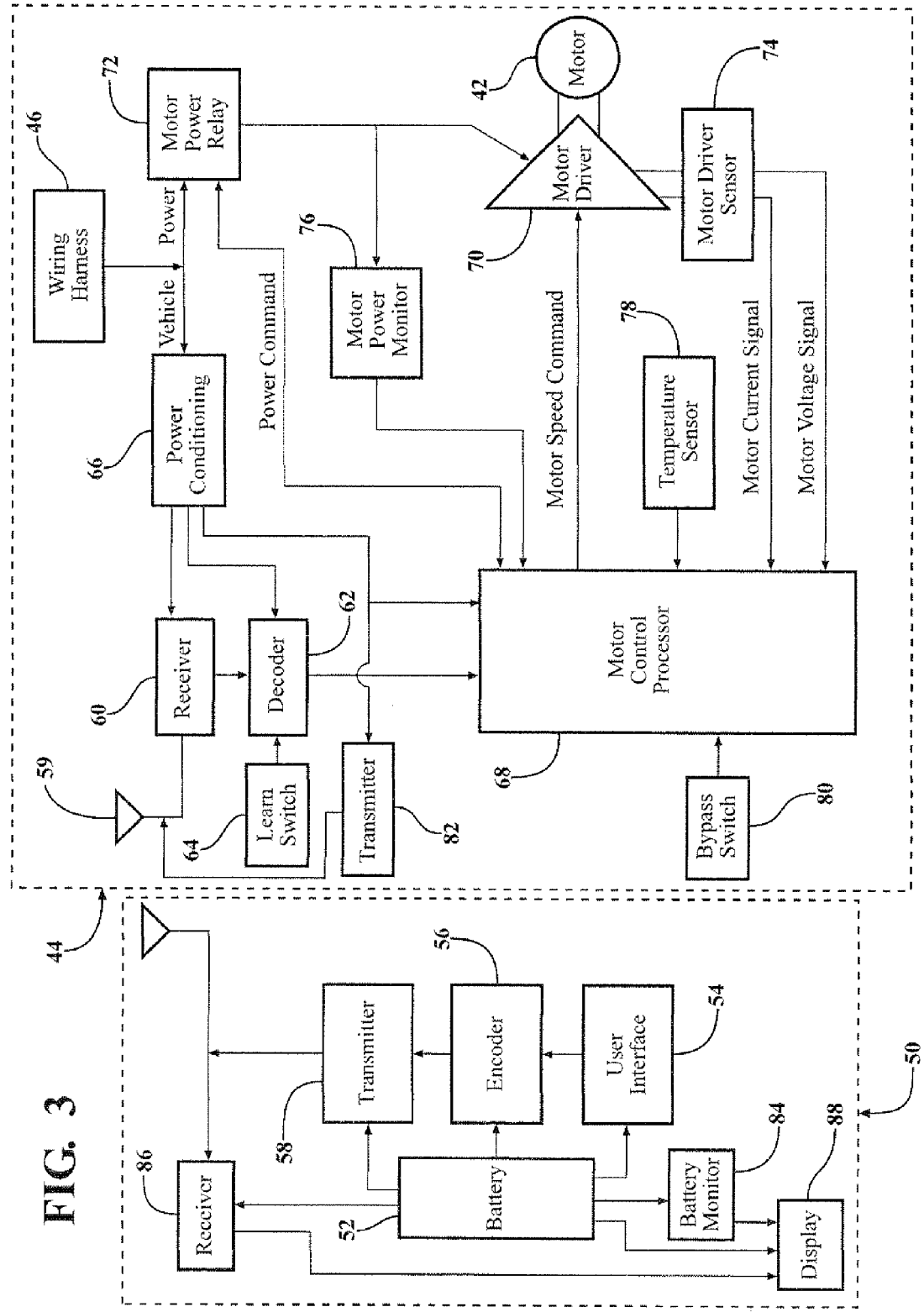
FIG. 3 is a schematic of another embodiment of a control circuit.
Figure 4:
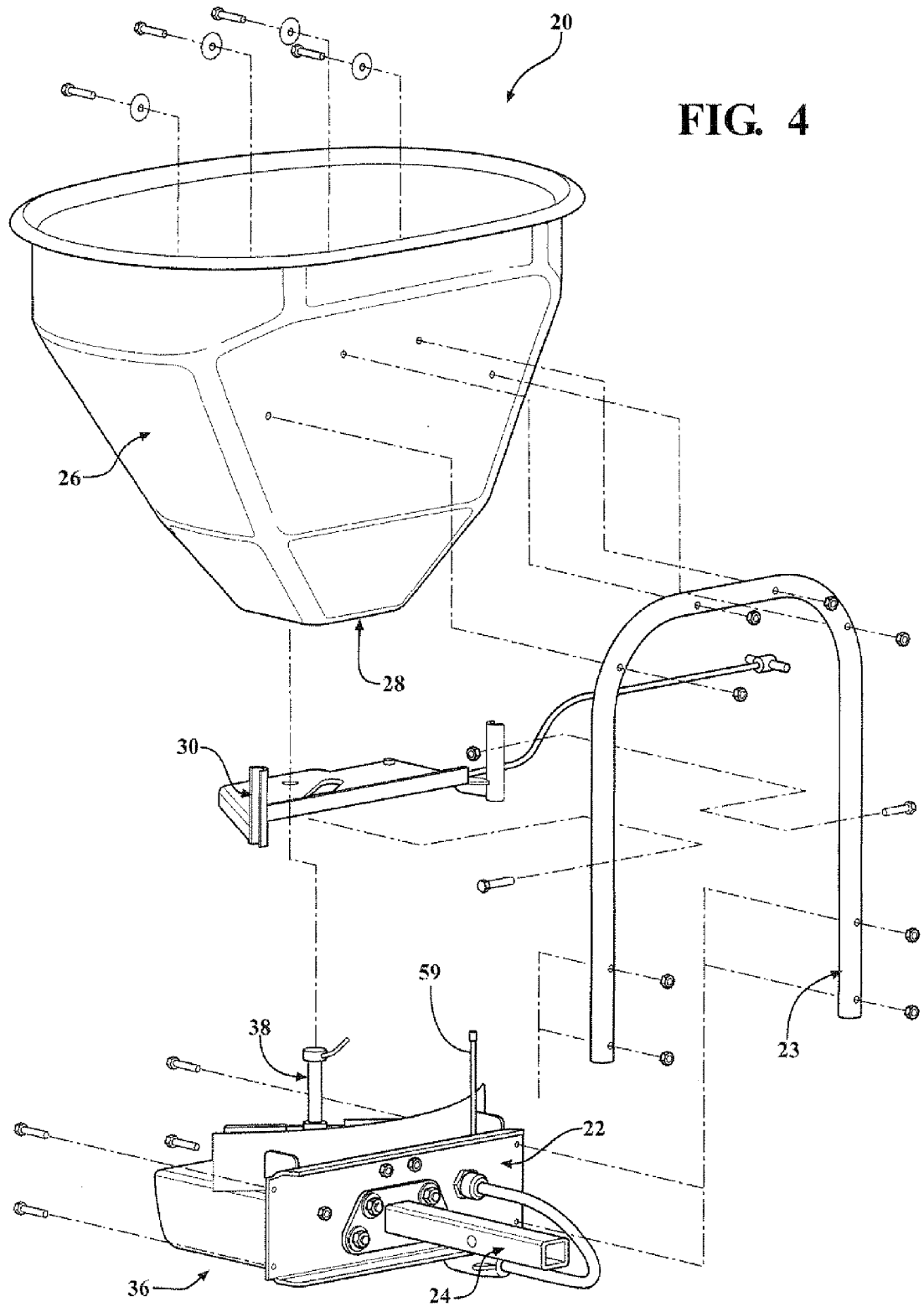
FIG. 4 is an exploded perspective view of the embodiment of FIG. 1.
Figure 5:
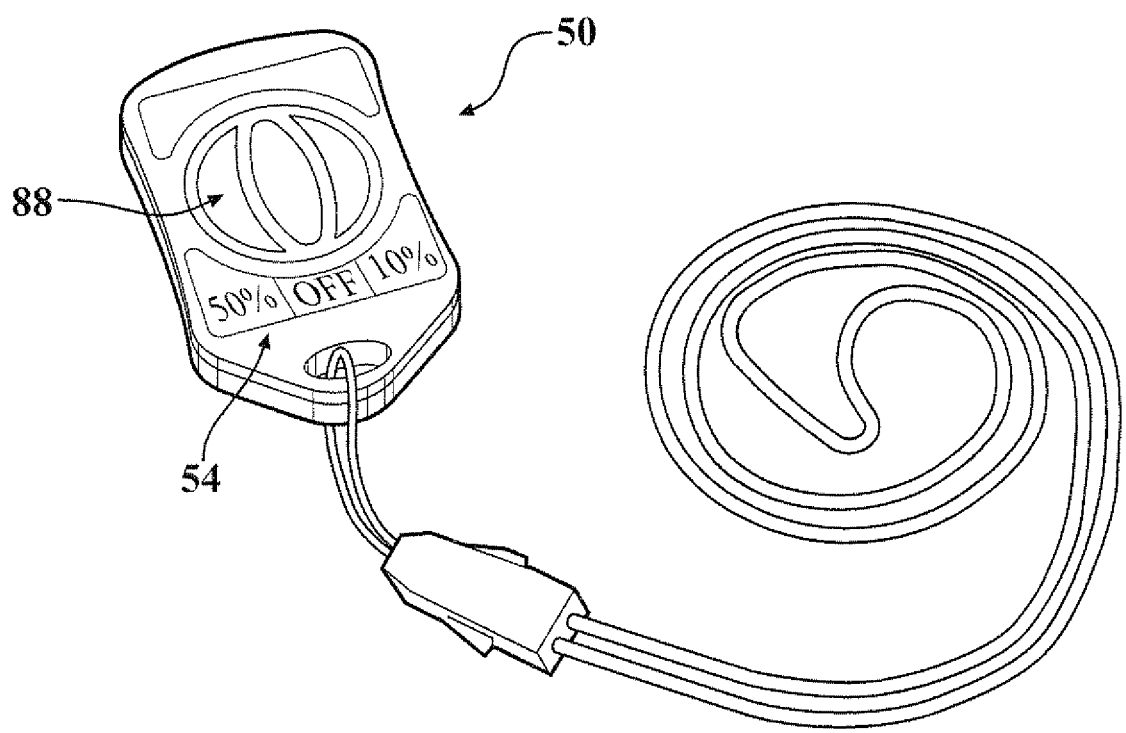
FIG. 5 is a perspective view of the preferred configuration of a remote.

FIG. 3 shows a schematic diagram of the control circuit 44 and the remote 50 configured for two way wireless communication. In this alternative embodiment, the control circuit 44 and remote 50 feature all of the same components used for one way wireless communication with the addition of other components. In this embodiment, the motor control processor 68 generates at least one motor feedback signal in response to receiving at least one component feedback signal from a component feedback sensor. This embodiment envisions using the same component feedback sensors 74, 76, 78 used in the previous embodiment including the motor driver sensor 74, the motor power monitor 76, and the temperature sensor 78, although it is recognized that other sensors may be used. According to this embodiment, the motor control processor 68 generates a motor feedback signal communicating a motor speed reading, an on/off power status, an overheat warning, an overload warning, a short circuit warning, and a broken circuit warning.

In this embodiment, the control circuit 44 further includes a radio frequency transmitter 82 for receiving the motor feedback signal from the motor control processor 68 and transmitting the same to the remote 50. The remote 50 in this embodiment includes a battery 52 of predetermined voltage for electrical power and a battery monitor 84 for measuring the voltage of the battery 52. The battery monitor 84 generates a low battery warning when the voltage measurement falls below the predetermined voltage of the battery 52. The remote 50 also includes a radio frequency receiver 86 for receiving the motor feedback signal transmitted by the radio frequency transmitter 82 of the control circuit 44. The remote 50 further includes a display 88 presenting the low battery warning generated by the battery monitor 84 and the motor speed reading, the on/off power status, the overheat warning, the overload warning, the short circuit warning, and the broken circuit warning communicated by the motor feedback signal.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A material spreader assembly for broadcast spreading of particulate material from a vehicle having a trailer wiring connector supplying electrical current below a predetermined level and of a known polarity comprising;

a frame, a hopper supported by said frame for storing particulate material, a spreader powered by electrical current including at least one rotating component for receiving and dispersing said particulate material from said hopper and an electric motor connected to said rotating component for rotationally driving said rotating component, a coupler connected to said frame and supporting said frame on the vehicle, a wiring harness presenting a plug interface configured to detachably engage a trailer wiring connector of a vehicle to receive electrical current therefrom, a remote having an ON selection and an OFF selection to generate and send an ON signal communicating said ON selection and an OFF signal communicating said OFF selection, a control circuit including a motor control processor providing start-up of said electric motor in response to said ON signal and generating a power ON command corresponding with said ON selection and generating at least one motor speed command and providing shut-off of said electric motor in response to said OFF signal and generating a power OFF command corresponding to said OFF selection, said control circuit further including a motor driver electrically connected to said electric motor to receive said at least one motor speed command and deliver to said electric motor an electrical current corresponding to said at least one motor speed command, and said control circuit further including a motor power relay electrically connected to and receiving electrical power from said wiring harness to relay electrical current from said wiring harness to said motor driver in response to said power ON command and disconnecting electrical current from said motor driver in response to said power OFF command and providing reverse polarity protection to said motor driver by disconnecting electrical current from said motor driver in response to receiving electrical current from said wiring harness having a polarity opposite the known polarity.

2. An assembly as set forth in claim 1 further including said remote having a radio frequency transmitter housed within said remote transmitting said ON signal and said OFF signal and said control circuit including a radio frequency receiver to receive said ON signal and said OFF signal transmitted by said radio frequency transmitter of said remote and send said ON signal and said OFF signal to said motor control processor.

3. An assembly as set forth in claim 2 further including an encoder housed within said remote adding a unique serial number to said ON signal and said OFF signal to generate a coded ON signal and a coded OFF signal and said control circuit including a decoder having a memory storing said unique serial number and a signal processor receiving said coded ON signal and said coded OFF signal and removing said unique serial number from said coded ON signal and said coded OFF signal to reproduce said ON signal and said OFF signal and send said ON signal and said OFF signal to said motor control processor.

4. An assembly as set forth in claim 3 further comprising said control circuit including a learn switch electrically connected to said decoder and having an ON position and an OFF position and said ON position directing said signal processor to initiate a learn mode to parse said unique serial number from said coded ON signal and said coded OFF signal and store said unique serial number in said memory of said decoder and said OFF position directing said signal processor to discontinue said learn mode.

5. An assembly as set forth in claim 1 wherein said control circuit includes a bypass switch having an ON position and an OFF position and being electrically connected to said motor control processor, said ON position directing said motor control processor to initiate a bypass mode to disregard said ON signal and said OFF signal and to initiate start-up of said electric motor with a final motor speed command corresponding to a maximum electrical current and said OFF position directing motor control processor to initiate said shut-off of said electric motor and to cease sending said at least one motor speed command and said power ON command until a new power-up sequence is performed.

6. An assembly as set forth in claim 1 further comprising:
at least one component feedback sensor generating at least one component feedback signal, and
said motor control processor being responsive to said at least one component feedback signal and generating at least one motor feedback signal in response to said at least one component feedback signal.

7. An assembly as set forth in claim 6 wherein said control circuit includes;
a motor driver electrically connected to said electric motor to receive said at least one motor speed command and deliver to said electric motor an electrical current corresponding to said at least one motor speed command,
a motor power relay electrically connected to and receiving electrical power from said wiring harness to relay electrical current from said wiring harness to said motor driver in response to said power ON command and disconnecting electrical current from said motor driver in response to said power OFF command and providing reverse polarity protection to said motor driver by disconnecting electrical current from said motor driver in response to receiving electrical current from said wiring harness having a polarity opposite the known polarity,
a motor driver sensor connected to said motor driver and sending a motor current signal and a motor voltage signal,
a motor power monitor electrically connected to said motor power relay and said motor driver and sending a motor power signal, and
a temperature sensor for measuring an electric circuitry temperature and sending a temperature signal.

8. An assembly as set forth in claim 6 further comprising; said control circuit including a radio frequency transmitter transmitting said motor feedback signal, and
said remote including a radio frequency receiver receiving said motor feedback signal and having a display presenting a motor speed reading and an on/off power status and an overheat warning and an overload warning and a short circuit warning and a broken circuit warning in response to said motor feedback signal.

9. An assembly as set forth in claim 6 further comprising;
said control circuit including a radio frequency transmitter transmitting said motor feedback signal, and
said remote including a battery of a predetermined voltage providing electrical power and a battery monitor performing a voltage measurement of said battery and generating a low battery warning signal in response to said voltage measurement being below said predetermined voltage, and
said remote including a radio frequency receiver receiving said motor feedback signal and having a display presenting a motor speed reading and an on/off power status and an overheat warning and an overload warning and a short circuit warning and a broken circuit warning and a low battery warning in response to said motor feedback signal and said low battery warning signal.

10. A material spreader assembly for broadcast spreading of particulate material from a vehicle having a trailer wiring connector supplying electrical current below a predetermined level and of a known polarity comprising;
a frame,
a hopper supported by said frame for storing particulate material,
a spreader powered by electrical current for receiving and dispersing the particulate material from said hopper and creating a transient electrical current draw spike above the predetermined level in response to a start-up by sudden application of electrical current from the vehicle,
a coupler connected to said frame and supporting said frame on the vehicle,
a wiring harness presenting a plug interface configured to detachably engage a trailer wiring connector of a vehicle to receive electrical current therefrom,
a control circuit electrically connected to said wiring harness and configured to deliver to said spreader at said start-up an initial electrical current level limited to a predetermined level and said control circuit further configured to gradually increase with time the electrical current to a final electrical current level above the predetermined level to avoid said transient electrical current draw spike and enable said start-up of said spreader using the electric current provided by the vehicle;
at least one rotating component for receiving and dispersing said particulate material from said hopper and an electric motor connected to said rotating component for rotationally driving said rotating component and creating said transient electrical current draw spike above the predetermined level in response to said start-up by sudden application of electrical current from the vehicle;
a remote having an ON selection and an OFF selection to generate and send an ON signal communicating said ON selection and an OFF signal communicating said OFF selection, and
said control circuit including a motor control processor providing said start-up of said electric motor in response to said ON signal and generating a power ON command corresponding with said ON selection and generating an initial motor speed command corresponding to an initial electrical current level below the predetermined level and generating subsequent motor speed commands gradually changing with time to correspond with gradually increasing levels of electrical current and generating a final motor speed command corresponding to an electrical current level above the predetermined level and providing shut-off of said electric motor in response to said OFF signal and generating a power OFF command corresponding to said OFF selection; and a motor driver electrically connected to said electric motor to receive each of said motor speed commands and deliver to said electric motor an electrical current corresponding to each of said motor speed commands, and a motor power relay electrically connected to and receiving electrical power from said wiring harness to relay electrical current from said wiring harness to said motor driver in response to said power ON command and disconnecting electrical current from said motor driver in response to said power OFF command and for providing reverse polarity protection to said motor driver by disconnecting electrical current from said motor driver in response to receiving electrical current from said wiring harness having a polarity opposite the known polarity.

11. A material spreader assembly for broadcast spreading of particulate material from a vehicle having a trailer wiring connector supplying electrical current below a predetermined level and of a known polarity comprising:

a frame, a hopper supported by said frame for storing particulate material, a spreader powered by electrical current for receiving and dispersing the particulate material from said hopper and creating a transient electrical current draw spike above the predetermined level in response to a start-up by sudden application of electrical current from the vehicle, a coupler connected to said frame and supporting said frame on the vehicle, a wiring harness presenting a plug interface configured to detachably engage a trailer wiring connector of the a vehicle to receive electrical current therefrom, a control circuit electrically connected to said wiring harness and configured to deliver to said spreader at said start-up an initial electrical current level limited to a predetermined level and said control circuit further configured to gradually increase with time the electrical current to a final electrical current level above the predetermined level to avoid said transient electrical current draw spike and enable said start-up of said spreader using the electric current provided by the vehicle;

a remote having an ON selection and an OFF selection to generate and send an ON signal communicating said ON selection and an OFF signal communicating said OFF selection; and at least one rotating component for receiving and dispersing said particulate material from said hopper and an electric motor connected to said rotating component for rotationally driving said rotating component and creating said transient electrical current draw spike above the predetermined level in response to said start-up by sudden application of electrical current from the vehicle;

said control circuit including a motor control processor providing said start-up of said electric motor in response to said ON signal and generating a power ON command corresponding with said ON selection and generating an initial motor speed command corresponding to an initial electrical current level below the predetermined level and generating subsequent motor speed commands gradually changing with time to correspond with gradually increasing levels of electrical current and generating a final motor speed command corresponding to an electrical current level above the predetermined level and providing shut-off of said electric motor in response to said OFF signal and generating a power OFF command corresponding to said OFF selection, at least one component feedback sensor generating at least one component feedback signal having a predetermined fault limit, said motor control processor being responsive to said at least one component feedback signal to provide an emergency shut-off feature by generating said power OFF command in response to detecting said predetermined fault limit in said at least one component feedback signal.

12. An assembly as set forth in claim 11 wherein said control circuit includes;

a motor driver electrically connected to said electric motor to receive each of said motor speed commands and deliver to said electric motor an electrical current corresponding to each of said motor speed commands, a motor power relay electrically connected to and receiving electrical power from said wiring harness to relay electrical current from said wiring harness to said motor driver in response to said power ON command and disconnecting electrical current from said motor driver in response to said power OFF command and providing reverse polarity protection to said motor driver by disconnecting electrical current from said motor driver in response to receiving electrical current from said wiring harness having a polarity opposite the known polarity, a motor driver sensor electrically connected to said motor driver sending a motor voltage signal and a motor current signal, a motor power monitor electrically connected to said motor power relay and said motor driver sending a motor power signal, and a temperature sensor measuring an electric circuitry temperature and sending a temperature signal.

13. An assembly as set forth in claim 11 further including said remote having a radio frequency transmitter housed within said remote transmitting said ON signal and said OFF signal and said control circuit including a radio frequency receiver receiving said ON signal and said OFF signal transmitted by said radio frequency transmitter of said remote and sending said ON signal and said OFF signal to said motor control processor.

14. An assembly as set forth in claim 13 further including an encoder housed within said remote adding a unique serial number to said ON signal and said OFF signal to generate a coded ON signal and a coded OFF signal and said control circuit including a decoder having a memory storing said unique serial number and a signal processor receiving said coded ON signal and said coded OFF signal and removing said unique serial number from said coded ON signal and said coded OFF signal to reproduce said ON signal and said OFF signal and send said ON signal and said OFF signal to said motor control logic circuit.

15. An assembly as set forth in claim 14 further comprising said control circuit including a learn switch having an ON position and an OFF position and electrically connected to said decoder, said ON position directing said signal processor to initiate a learn mode to parse said unique serial number from said coded ON signal and said coded OFF signal and store said unique serial number in said memory of said decoder and said OFF position directing said signal processor to discontinue said learn mode.

16. An assembly as set forth in claim 11 wherein said control circuit includes a bypass switch electrically connected to said motor control processor having an ON position and an OFF position, said ON position directing said motor control processor to initiate a bypass mode in response to said start-up of said electric motor and said bypass mode directing said motor control processor to disregard said ON signal and said OFF signal and to initiate said start-up of said electric motor with said final motor speed command corresponding to a maximum electrical current and said OFF position directing said motor control processor to initiate said shut-off of said electric motor and to cease sending any of said motor speed commands and said power ON command until a new power-up sequence is performed.

17. A material spreader assembly for broadcast spreading of particulate material from a vehicle having a trailer wiring connector supplying electrical current below a predetermined level and of a known polarity comprising:
a frame,
a hopper supported by said frame for storing particulate material,
a spreader powered by electrical current for receiving and dispersing the particulate material from said hopper and creating a transient electrical current draw spike above the predetermined level in response to a start-up by sudden application of electrical current from the vehicle,
a coupler connected to said frame and supporting said frame on the vehicle,
a wiring harness presenting a plug interface configured to detachably engage a trailer wiring connector of a vehicle to receive electrical current therefrom,
a control circuit electrically connected to said wiring harness and configured to deliver to said spreader at said start-up an initial electrical current level limited to a predetermined level and said control circuit further configured to gradually increase with time the electrical current to a final electrical current level above the predetermined level to avoid said transient electrical current draw spike and enable said start-up of said spreader using the electric current provided by the vehicle;
a remote having an ON selection and an OFF selection to generate and send an ON signal communicating said ON selection and an OFF signal communicating said OFF selection; and
said control circuit including a motor control processor providing said start-up of said electric motor in response to said ON signal and generating a power ON command corresponding with said ON selection and generating an initial motor speed command corresponding to an initial electrical current level below the predetermined level and generating subsequent motor speed commands gradually changing with time to correspond with gradually increasing levels of electrical current and generating a final motor speed command corresponding to an electrical current level above the predetermined level and providing shut-off of said electric motor in response to said OFF signal and generating a power OFF command corresponding to said OFF selection.
at least one component feedback sensor for generating at least one component feedback signal,
at least one rotating component for receiving and dispersing said particulate material from said hopper and an electric motor connected to said rotating component for rotationally driving said rotating component and creating said transient electrical current draw spike above the predetermined level in response to said start-up by sudden application of electrical current from the vehicle,
said motor control processor being responsive to said at least one component feedback signal to generate at least one motor feedback signal in response to said at least one component feedback signal.

18. An assembly as set forth in claim 17 further comprising said control circuit including a power conditioning circuit electrically connected to said wiring harness receiving from said wiring harness electrical current having a fluctuating voltage and carrying an electronic noise signal and said power conditioning circuit having an electronic filter removing said electronic noise signal and a voltage regulator transforming said fluctuating voltage to a steady state voltage to provide conditioned electrical current to said control circuit.

19. An assembly as set forth in claim 18 further including said power conditioning circuit having at least one blocking diode providing reverse polarity protection to said control circuit.

20. An assembly as set forth in claim 17 further comprising:
said control circuit including a radio frequency transmitter transmitting said motor feedback signal, and
said remote including a radio frequency receiver receiving said motor feedback signal and having a display presenting a motor speed reading and an on/off power status and an overheat warning and an overload warning and a short circuit warning and a broken circuit warning in response to said motor feedback signal.

21. An assembly as set forth in claim 17 further comprising:
said control circuit including a radio frequency transmitter transmitting said motor feedback signal, and
said remote including a battery of a predetermined voltage providing electrical power and a battery monitor performing a voltage measurement of said battery and generating a low battery warning signal in response to said voltage measurement being below said predetermined voltage, and
said remote including a radio frequency receiver receiving said motor feedback signal and having a display presenting a motor speed reading and an on/off power status and an overheat warning and an overload warning and a short circuit warning and a broken circuit warning and a low battery warning in response to said motor feedback signal and said low battery warning signal.

22. A material spreader assembly for broadcast spreading of particulate material from a vehicle having a trailer wiring connector supplying electrical current below a predetermined level and of a known polarity comprising:
a frame,
a hopper supported by said frame for storing particulate material,
a spreader powered by electrical current for receiving and dispersing the particulate material from said hopper and creating a transient electrical current draw spike above the predetermined level in response to a start-up by sudden application of electrical current from the vehicle,
a coupler connected to said frame and supporting said frame on the vehicle,
a wiring harness presenting a plug interface configured to detachably engage a trailer wiring connector of a vehicle to receive electrical current therefrom,
a control circuit electrically connected to said wiring harness and configured to deliver to said spreader at said start-up an initial electrical current level limited to a predetermined level and said control circuit further configured to gradually increase with time the electrical current to a final electrical current level above the predetermined level to avoid said transient electrical current draw spike and enable said start-up of said spreader using the electric current provided by the vehicle;

at least one rotating component for receiving and dispersing said particulate material from said hopper and an electric motor connected to said rotating component for rotationally driving said rotating component and creating said transient electrical current draw spike above the predetermined level in response to said start-up by sudden application of electrical current from the vehicle;

a remote having an ON selection and an OFF selection to generate and send an ON signal communicating said ON selection and an OFF signal communicating said OFF selection, and said control circuit including a motor control processor providing said start-up of said electric motor in response to said ON signal and generating a power ON command corresponding with said ON selection and generating an initial motor speed command corresponding to an initial electrical current level below the predetermined level and generating subsequent motor speed commands gradually changing with time to correspond with gradually increasing levels of electrical current and generating a final motor speed command corresponding to an electrical current level above the predetermined level and providing shut-off of said electric motor in response to said OFF signal and generating a power OFF command corresponding to said OFF selection, at least one component feedback sensor for generating at least one component feedback signal, and said motor control processor being responsive to said at least one component feedback signal to generate at least one motor feedback signal in response to said at least one component feedback signal, wherein said control circuit includes:

a motor driver electrically connected to said electric motor to receive each of said motor speed commands and deliver to said electric motor an electrical current corresponding to each of said motor speed commands, a motor power relay electrically connected to and receiving electrical power from said wiring harness to relay electrical current from said wiring harness to said motor driver in response to said power ON command and disconnecting electrical current from said motor driver in response to said power OFF command and providing reverse polarity protection to said motor driver by disconnecting electrical current from said motor driver in response to receiving electrical current from said wiring harness having a polarity opposite the known polarity, a motor driver sensor connected to said motor driver sending a motor current signal and a motor voltage signal, a motor power monitor electrically connected to said motor power relay and said motor driver sending a motor power signal, and a temperature sensor measuring an electric circuitry temperature and sending a temperature signal.

* * * * *